April 24, 1928.
J. F. WILGUS
1,667,367
CULTIVATOR
Filed Dec. 7, 1921
4 Sheets-Sheet 2
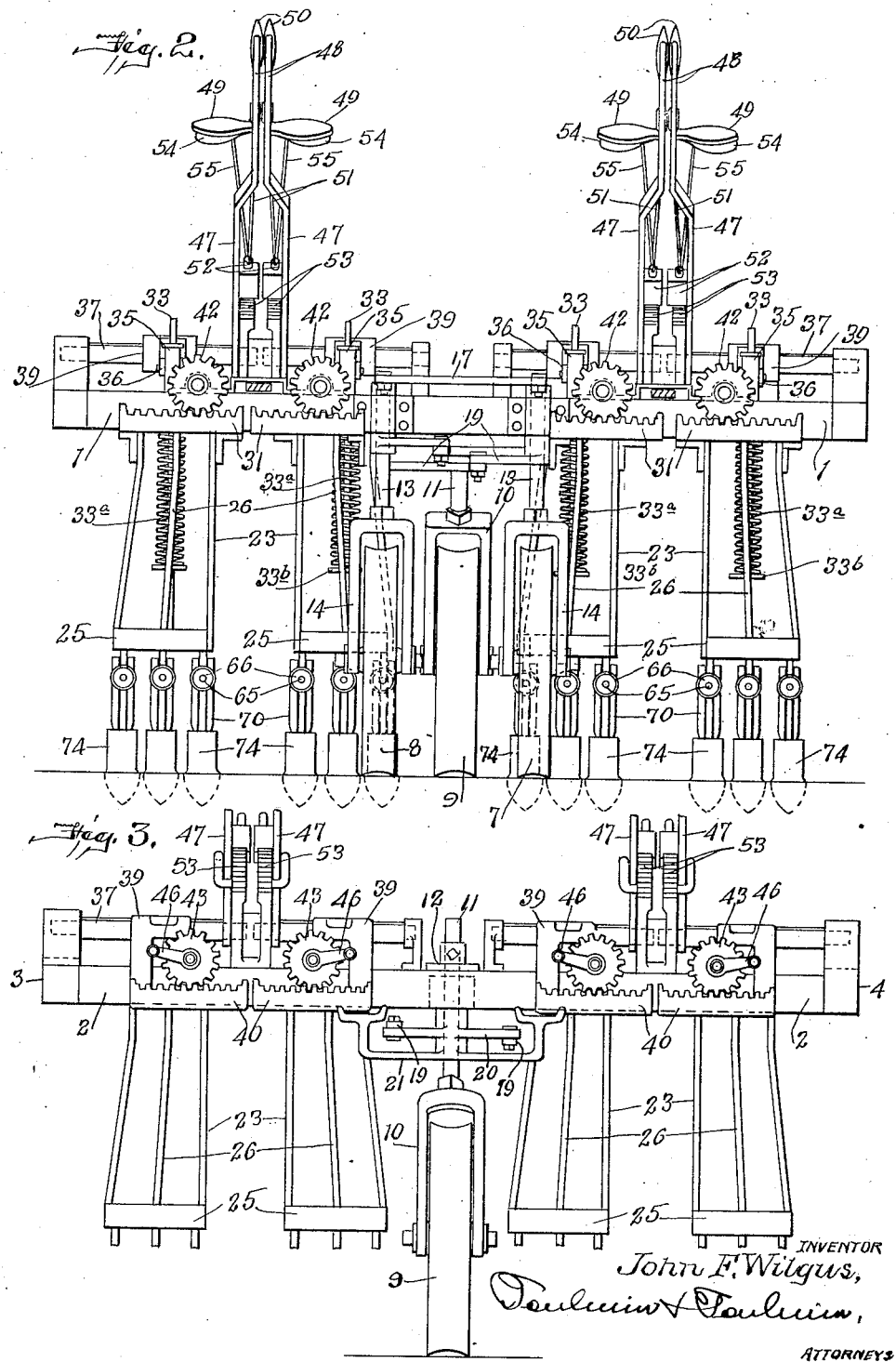

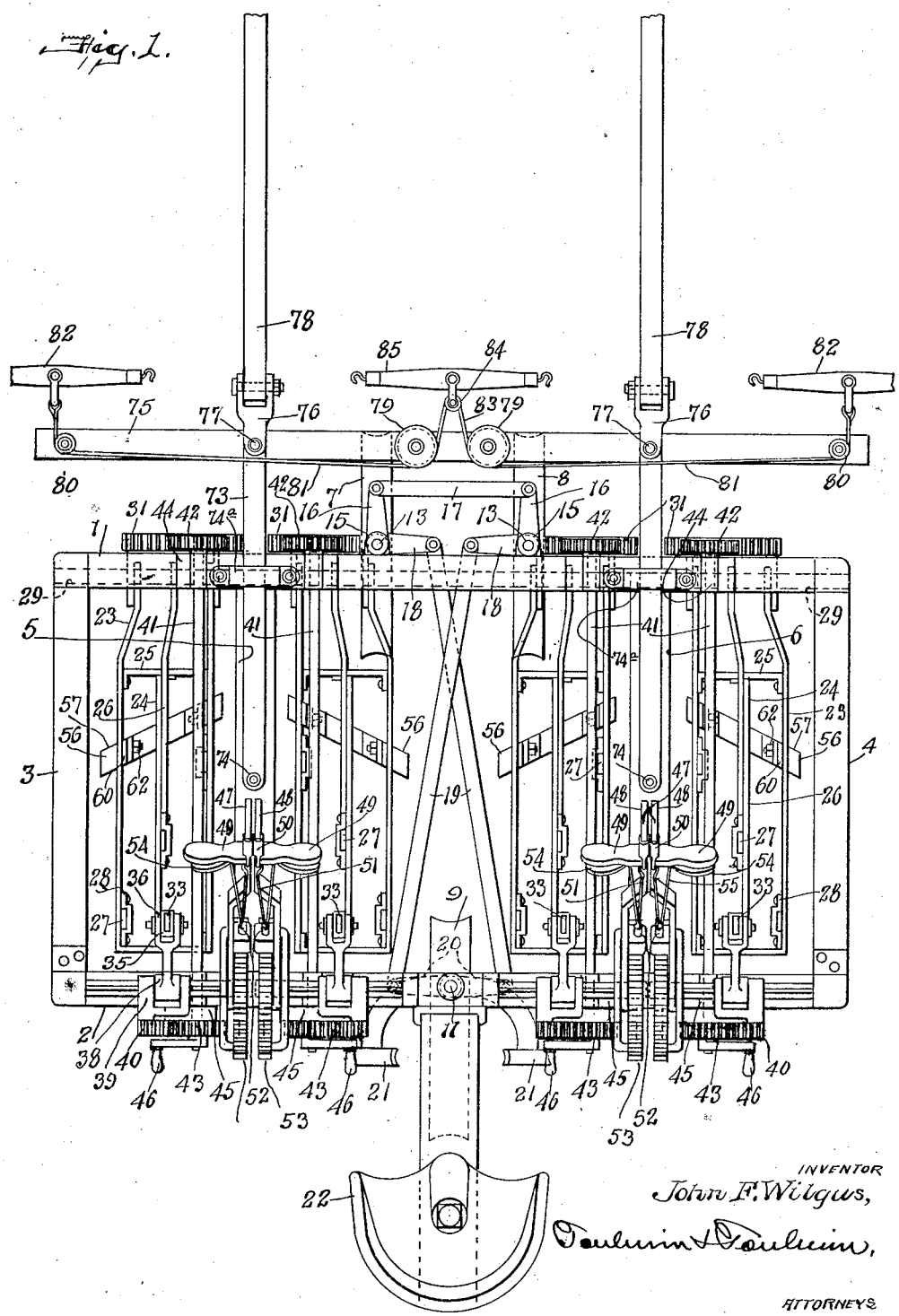

April 24, 1928.  J. F. WILGUS  1,667,367
CULTIVATOR
Filed Dec. 7, 1921   4 Sheets-Sheet 3
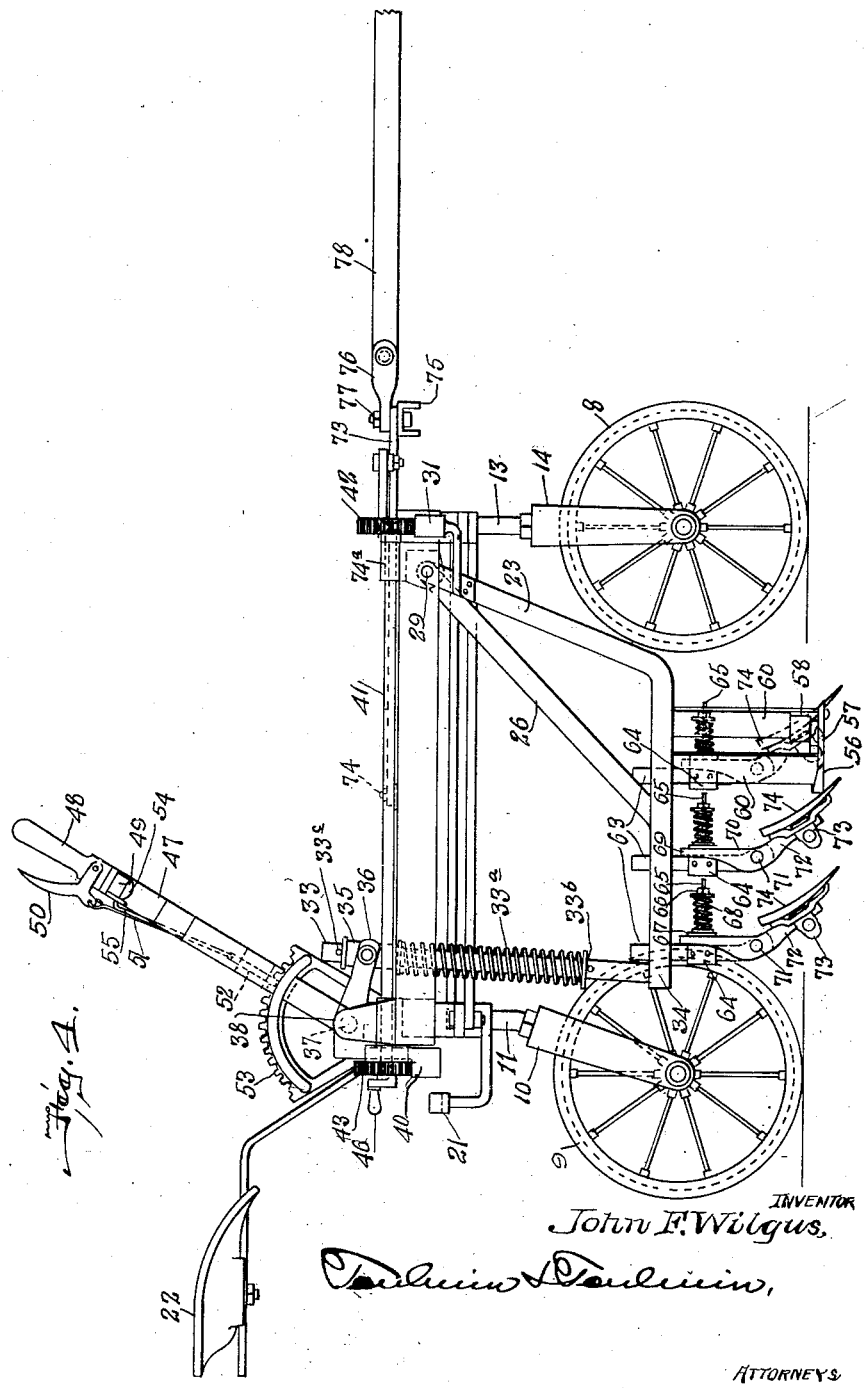

April 24, 1928.  1,667,367
J. F. WILGUS
CULTIVATOR
Filed Dec. 7, 1921  4 Sheets-Sheet 4
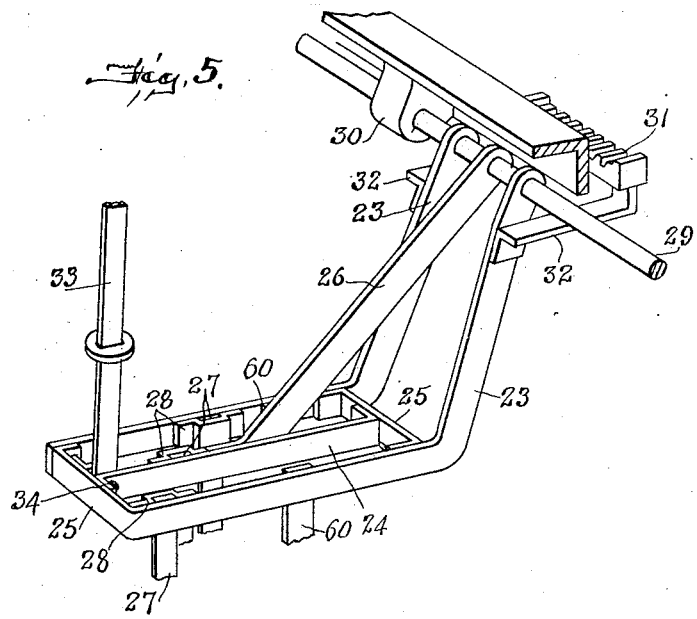
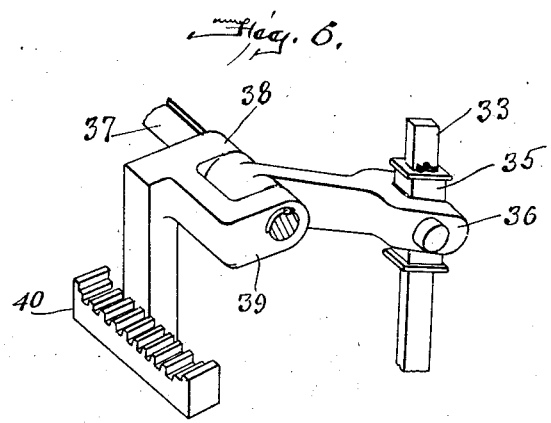
INVENTOR
John F. Wilgus,
ATTORNEYS Patented Apr. 24, 1928.

1,667,367

UNITED STATES PATENT OFFICE.

JOHN F. WILGUS, OF CASSTOWN, OHIO.

CULTIVATOR.

Application filed December 7, 1921. Serial No. 520,508.

This invention relates to improvements in cultivators for use in the cultivation of fields having growing crops of corn.

The object of the invention is to provide shovel gangs with rack and pinion mechanism to maintain the gangs in parallelism as well as to adjust them laterally with respect to each other and with respect to the row of growing corn.

Another object is to provide dual levers for elevating a pair of gangs in such wise that by grasping one lever of the pair one gang may be adjusted or by grasping both levers two gangs may be adjusted.

Another object of the invention is to provide a foot mechanism by which the wheels of the cultivator may be directed laterally to shift the machine quickly to either side of its general path or to more readily make it follow irregularities in the line of the growing plants.

These and other objects will be made to appear more fully in the following specification.

In the accompanying drawings:

Fig. 1 is a plan view of my improved cultivator;

Fig. 2 is a front elevation of the machine;

Fig. 3 is a rear elevation, with the shovels omitted;

Fig. 4 is a side elevation;

Fig. 5 is a detail perspective view of one of the gangs and its associated rack;

Fig. 6 is a perspective view of one of the rear racks, one of the arms and rods for elevating and depressing a gang and of the rockshaft.

The frame of this machine comprises a forward cross bar 1, a rear cross bar 2 and side bars 3 and 4. By preference these bars are made of angle iron. Two intermediate beams 5 and 6 also form part of the frame. This frame is mounted upon three wheels 7 and 8 at the front and 9 at the rear. A yoke 10 connects with a post 11 to constitute the wheel mounting and the post is rotatably fitted in a bearing 12 secured to the rear cross beam 2, as seen in Fig. 3. The posts 13 and the yokes 14 of the wheels 7 and 8 stand essentially in the vertical. The posts 13 are rotatably mounted in bearings 15 secured to the forward beam, in any convenient manner, as indicated in Fig. 1. Each post 13 carries a crank arm 16 and these arms are interconnected by a link 17 by which an adjustment applied to either post will be transmitted to the other. Each post is also equipped with a steering crank 18 each connected with a steering rod 19, these rods crossing each other and being at their ends attached to a steering lever comprising a bar 20 and foot pieces 21, pivotally mounted on the post 11 of the rear wheel 9.

In this manner the operator sitting on the seat 22 and applying his feet to the foot pieces cannot only keep the machine in a straight-ahead course but may readily and quickly steer it to either side by changing the course or direction of the wheels 7 and 8.

The gangs are preferably made of flat metal bars, as seen in Figs. 1 and 5 particularly. Each gang comprises outer bars 23, an inner bar 24, cross bars 25 and a brace 26. The shovel standards 27 are secured by brackets 28 to the respective outer and inner bars. The forward upper ends of the bars 23 and the brace 26 are pivotally hung on a cross shaft or rod 29 connected by brackets 30, or otherwise, to the forward frame member 1. While the gang can be lifted and lowered due to the pivotal connection with the bar 29 it cannot be swung laterally at its rear end but can only be adjusted bodily sidewise due to the extended bearing on the rod 29 constituted of the bars 23 and brace 26.

The rearward end of each gang is connected to the frame through a pressure rod 33 pivoted at 34 at its lower end and having near its upper end a sleeve 35 to which is connected a crank arm 36 mounted on a rockshaft 37 carried in bearings 38. These crank arms 36 are located within the jaws of a carriage 39 slidably mounted on the rockshaft 37 and equipped with a rack 40.

It will now be understood that when these racks 31 and 40 are adjusted laterally the forward ends of the gangs will slide laterally on the bar 29 and the rear ends will move with the carriage 39, crank arm 36 and pressure rod 33. The mechanism for adjusting the gangs laterally, toward the center or outward, comprises a shaft 41 for each gang, each shaft having a pinion 42 for the rack 31 and a pinion 43 for the rack 40. These shafts 41 are mounted in suitable bearings on the frame, as 44 and 45, and each has a crank 46 by which it is rotated.

To adjust the gangs to different positions with respect to the frame and to adjust the two gangs of each pair, or the inner gangs of both pairs, the cranks 46 are turned. This is usually done before entering upon the cultivation of the rows. And the distance between the two gangs of one pair or between the inner gangs of both pairs may in this way be quickly adjusted to suit the condition at hand. In all these adjustments the gangs maintain their parallelism one with the other.

Referring now to the means for raising and lowering the gangs I would state that these consist of levers 47 mounted rigidly on the rockshaft 37. These levers are in pairs, as shown in Fig. 1. Each lever has two handles, one at 48 and one at 49. The levers are in pairs, each lever of each pair being brought close together at the operating end so that both handles 48, together with the adjacent finger piece 50 for lifting by the rod 51 the detent 52 from connection with the toothed rack 53 can be manipulated at the same time by the application of the hand of the operator around both handles 48. And the levers can be separately operated by taking hold of one or the other of the handles 49 and at the same time manipulating the finger piece 54 connected by the rod 55 with the detent 52. Each lever has its toothed rack 53.

These manipulations of the lever or levers partially rotate the rockshaft 37 and cause the arms 36 and rods 33 to lift or depress the gangs, one gang at a time or a pair of gangs at a time, or three gangs or four gangs at a time. But usually it will be desired to lift but one gang or both gangs of one pair at a time. The rods 33 are equipped with the usual pressure springs 33$^a$ which are placed between the collar 35 and a pin and washer 33$^b$ so that pressure exerted by the crank arm 36 may be transferred through the rod and spring to the gang. A pin 33$^c$ serves to limit the upward movement of the sleeve 35 on the rod. Each gang is so equipped so that this description of one applies equally to all.

I have before observed that a lateral adjustment of the carriages 39 will carry the arms 36 and in turn the rods 33 will assist in moving the rear ends of the gangs laterally, though this is effectually done by the broad bearing constituted of the bars 23 on the rod 29. For this reason the rear racks 40 and pinions 43 may be dispensed with or may be regarded merely as means for laterally shifting the arms 36 the more readily to keep them in proper relation to the gangs when the latter are laterally adjusted.

I will now refer to the construction and application of that feature of my invention which relates to the weeder which is in the nature of an attachment that is applied to the gangs. It will usually occupy an oblique or angular position, as shown in Fig. 1, where the blade of the weeder is designated 56. This bar has a cutting edge 57 and is attached to standards 60 connected to the beams 23 of the gangs by nuts and bolts. As shown in Fig. 1 the cutter 56—57 is positioned at an angle so as to give a draw cut in acting on the weeds. And it will be noted too that this cutter extends from entirely across, and somewhat beyond, the shovel gang, so that all of the space covered by the shovels and that space between the shovels, which is not reached by them, is fully covered by this cutter. And it will be observed too that its position on the gang is in advance of the shovels. Thus, with this cutter and the shovels very effective cultivation is done, while the weeds are also cut off or torn up.

Referring now to the spring-break devices for the shovels it will be seen that this spring-break comprises a standard 63 in the form of a metal bar about which is fitted and to which is fixed a band 64 from which projects a rod 65 carrying a nut and washer 66 and a collar 67 with a spiral spring 68 between the washer and collar. The spring exerts a force against the upper members 69 of the shovel holder 70 which is pivoted at 71 to the lower end of the standard 63 and extended thence, as shown at 72, to receive or fit within the clip 73 to which is attached a shovel 74. The holder 70 is bifurcated at its upper end to straddle the rod 65 and also the standard 63. The band 64 incidentally forms a shoulder against which the members 69 are pressed by the spring and collar.

It will now be seen that when a shovel meets with an obstruction that does not yield or which exceeds in resistance the tension of the spring 68, the lower end of the holder 70 will spring back under the pressure on the shovel, turning on its pivot 71 and compressing the spring by the forward thrust of the members 69. But as soon as the obstruction is past or the shovel has bent back far enough to drag over the obstruction, then the spring returns the members 69 against the band 64 and the parts are again in normal position for normal work.

Referring now to the draft appliances by which the horses are hitched to the cultivator, draft bars 73 are secured by bolts or rivets 74 to the beams 5 and 6, respectively, of the frame and held within clips 74$^a$. To these draft bars is secured a draft beam 75. Couplings 76 are pivoted to the draft bars 73 by the same bolts 77 employed to fasten the draft beam 75 to the draft bars. A pair of shafts 78 is coupled to the couplings 76.

Grooved draft rollers 79 are mounted on stud shafts on the draft bar 75, at points within or between the two shafts, while other draft pulleys 80 are mounted near the outer ends of the draft bar. These pulleys are free to turn on their bearings. A draft cable or chain 81 passes over the pulleys 80 and has attached to its ends singletrees 82 for the outer horses, while the middle portion of the cable passes over the pulley 79 and terminates in a loop 83 in which is placed a pulley 84 carried by a singletree 85.

Any slight inequality in the pulling which would allow one outer horse to advance a little ahead of the other is permitted by the freedom of movement of the cable on the pulleys.

It will now be seen that with my improved cultivator the shovel gangs may be adjusted laterally with respect to each other and with respect to the row of growing corn; that they may be raised and lowered independently or in pairs or all four at the same time; and that the operator may direct the course of the supporting wheels, both at the front and the rear in either direction to hasten the position of the machine to one side or the other for meeting the sinuosities of the corn rows.

It will further be understood that the weeder cooperating with the shovels enables the machine to not only cultivate the soil but to cut off or pull up weeds and other foul growth.

And it will further be noted that in case the shovels meet sufficient resistance the spring-break will permit them to yield so as to pass over such obstruction when they will automatically come back into normal position.

And finally, it will be seen that in some cases these improvements will be embodied in machines employing but one pair of shovel gangs so as to cultivate one row of corn at a time instead of two, as may be done with the machine illustrated.

Having thus fully described my invention, what I claim as new and desire to secure by Letters Patent, is:—

1. In a cultivator, the combination, with a frame and supporting wheels located at the front and rear of the frame, the rear wheel being substantially on the central line of draft and the forward wheels being spaced apart on either side thereof, of two pairs of shovel gangs, one pair at each side of said wheels, and rack and pinion mechanism adapted to adjust the gangs laterally.

2. In a cultivator, the combination, with a frame, supporting wheels therefor, and a transverse rod, of two pairs of shovel gangs slidably mounted on said rod, a rack connected with each pair and a pinion for each rack, the shaft of the pinion extending to and operable at the rear of the machine.

3. In a cultivator, the combination, with a frame and wheels therefor, of a shovel gang, a rack connected to its forward end, a lifting rod connected to its rear end and an arm connected to the upper end of the rod, a rack carriage engaging said arm, a shaft having a pinion for each of said racks and operable at the rear of the machine.

4. In a cultivator, the combination, with a frame, and supporting wheels, of a pair of shovel gangs connected with the forward part of the machine, rack and pinion mechanism to adjust said gangs laterally, a pair of levers mounted on the frame, and connections between each lever and a gang, said levers being operable conjointly to raise and lower both gangs and separately to raise and lower either gang.

5. In a cultivator, the combination, with a frame and its supporting wheels, of a pair of shovel gangs slidably connected to the forward part of the frame, a lifting rod connected to the rear of each gang, an arm on each rod, a rockshaft on which each arm is mounted, a pair of levers positioned close together and mounted one on one rockshaft and the other on the other rockshaft, said levers being adapted for conjoint or separate manipulation, racks secured to said gangs and other racks engaging said arms, and pinions to operate both sets of racks.

In testimony whereof, I affix my signature.

JOHN F. WILGUS.